(12) United States Patent
Kitawaki et al.

(10) Patent No.: US 11,361,791 B2
(45) Date of Patent: *Jun. 14, 2022

(54) ALUMINUM ALLOY SHEET FOR MAGNETIC DISK AND PRODUCTION METHOD THEREFOR, AND MAGNETIC DISK USING SAID ALUMINUM ALLOY SHEET FOR MAGNETIC DISK

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Makoto Yonemitsu, Tokyo (JP); Hideyuki Hatakeyama, Tokyo (JP); Sadayuki Toda, Tokyo (JP); Ryo Sakamoto, Tokyo (JP); Yasuo Fujii, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/262,971

(22) PCT Filed: Jul. 24, 2019

(86) PCT No.: PCT/JP2019/029023
§ 371 (c)(1),
(2) Date: Jan. 25, 2021

(87) PCT Pub. No.: WO2020/022380
PCT Pub. Date: Jan. 30, 2020

(65) Prior Publication Data
US 2021/0264944 A1 Aug. 26, 2021

(30) Foreign Application Priority Data
Jul. 25, 2018 (JP) .............................. JP2018-139811

(51) Int. Cl.
*C22C 21/00* (2006.01)
*G11B 5/73* (2006.01)
(Continued)

(52) U.S. Cl.
CPC .......... *G11B 5/73919* (2019.05); *C22C 21/00* (2013.01); *C22F 1/04* (2013.01); *G11B 5/8404* (2013.01)

(58) Field of Classification Search
CPC ......... C22C 21/06; C22C 21/08; C22F 1/047; G11B 5/73; G11B 5/7315; G11B 5/73919; G11B 5/8404
(Continued)

(56) References Cited

U.S. PATENT DOCUMENTS 10,767,247 B2 * 9/2020 Murata ................... C23C 18/32
2002/0149876 A1 10/2002 Sakata et al.
(Continued)

FOREIGN PATENT DOCUMENTS

EP 2263811 A1 12/2010
JP 04341535 A 11/1992
(Continued)

OTHER PUBLICATIONS

ISR issued in Int'l. Application No. PCT/JP2019/029023, dated Sep. 3, 2019.

*Primary Examiner* — Jie Yang
(74) *Attorney, Agent, or Firm* — Greer, Burns & Crain, Ltd.

(57) ABSTRACT

An aluminum alloy sheet for a magnetic disk includes an aluminum alloy comprising 0.10 to 3.00 mass % (hereafter simply "%") of Fe, 0.1 to 3.0% of Mn, 0.003 to 1.000% of Cu, and 0.005 to 1.000 s % of Zn, wherein second phase particles having a maximum diameter of 100 μm or more and 300 μm or less are dispersed at a distribution density of
(Continued)

50 particles/mm² or less in a region (A) occupying 25% or less of a sheet thickness from a sheet thickness center plane to opposite surfaces of the sheet, second phase particles having a maximum diameter of 100 μm or more and 300 μm or less are 0 particles/mm² in a region (C) that is obtained by excluding the region (A) from a region (B) occupying 50% or less of the sheet thickness from the sheet thickness center plane to the opposite surfaces of the sheet, and the amount of Mn solid solution is 0.03 mass % or more.

6 Claims, 4 Drawing Sheets

(51) Int. Cl.
*C22F 1/04* (2006.01)
*G11B 5/84* (2006.01)

(58) Field of Classification Search
USPC .......................................................... 420/553
See application file for complete search history.

(56) References Cited

U.S. PATENT DOCUMENTS

2017/0327930 A1* 11/2017 Kitawaki .................. C22F 1/04
2019/0284668 A1     9/2019 Murata et al.
2021/0012801 A1*  1/2021 Murata ..................... C22F 1/04

FOREIGN PATENT DOCUMENTS

| | | |
|---|---|---|
| JP | 2002313061 A | 10/2002 |
| JP | 2006241513 A | 9/2006 |
| JP | 2009256782 A | 11/2009 |
| JP | 2018081732 A | 5/2018 |
| WO | WO-2016190277 A1 * 12/2016 ........... G11B 5/8404 |

* cited by examiner

ALUMINUM ALLOY SHEET FOR MAGNETIC DISK AND PRODUCTION METHOD THEREFOR, AND MAGNETIC DISK USING SAID ALUMINUM ALLOY SHEET FOR MAGNETIC DISK

This is a National Phase Application filed under 35 U.S.C. § 371, of International Application No. PCT/JP2019/029023, filed Jul. 24, 2019, the contents of which are incorporated by reference.

TECHNICAL FIELD

The present disclosure relates to an aluminum alloy sheet for a magnetic disk, which has high strength and a favorable fluttering characteristic, a production method therefor, and a magnetic disk using the aluminum alloy sheet for a magnetic disk.

BACKGROUND ART

Magnetic disks used for storage devices of computers are produced using substrates that have favorable plating properties and excellent mechanical characteristics and workability. For example, a magnetic disk is produced from a substrate or the like, which is based on an aluminum alloy according to JIS 5086 (containing 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, and 0.25 mass % or less of Zn, with the balance of Al and unavoidable impurities).

A general magnetic disk is produced by first making an annular aluminum alloy substrate, plating the aluminum alloy substrate, and then depositing a magnetic substance on a surface of the aluminum alloy substrate.

For example, an aluminum alloy magnetic disk using the above-mentioned JIS 5086 alloy is produced according to the following production steps: First, an aluminum alloy material containing desired chemical components is cast, and the resultant ingot is subjected to hot rolling, and then to cold rolling, to make a rolled material having a thickness required for the magnetic disk. It is preferable to anneal the rolled material in the middle and/or the like of the cold rolling as needed. Then, an annular piece is punched from the rolled material, and, for removing distortion or the like caused in the above production step, the annular aluminum alloy sheets are stacked and subjected to pressure annealing in which the stacked sheets are annealed while applying pressure thereto from the opposite sides to flatten the sheets, thereby making an annular aluminum alloy substrate having an annular shape.

The annular aluminum alloy substrate thus made is subjected to lathing, grinding, degreasing, etching, and zincate treatment (Zn substitution treatment), as a pretreatment, and then subjected to electroless plating with Ni—P which is a hard non-magnetic metal, as an undercoat treatment. After polishing the plated surface, a magnetic substance is sputtered onto the Ni—P electroless plated surface of the substrate, to produce the magnetic disk made of an aluminum alloy.

Incidentally, in recent years, as there are needs of multimedia and the like, magnetic disks are required to have an increased capacity and an increased density, and a further increased speed. To increase the capacity, the number of magnetic disks mounted in a storage device is increasing, and accordingly, it is required to reduce the thickness of magnetic disks. However, when the aluminum alloy substrate for a magnetic disk is reduced in thickness, the strength thereof is reduced, and hence there is a demand for increasing the strength of the aluminum alloy substrate.

Further, as the magnetic disk is reduced in thickness and increased in speed, a lowered rigidity of the magnetic disk and an increased fluid force due to high-speed rotation causes an increase in exciting force, which makes disk flutter liable to occur. This is because when the magnetic disk is rotated at a high speed, an unstable airflow is generated between the disks, and the airflow causes vibration (fluttering) of the magnetic disk. Such a phenomenon presumably occurs because the low rigidity of the substrate causes an increase in the vibration of the magnetic disk, and a head cannot follow the change. When fluttering occurs, the positioning error of the head as a reader increases. Therefore, there is a strong demand for reducing disk flutter.

Further, due to an increased density of the magnetic disk, the magnetic area per bit is made even more miniaturized. As a result of this miniaturization, a reading error is more liable to occur due to the deviation of a positioning error of the head, and hence there is a strong demand for reducing disk flutter which is a major cause of the positioning error of the head.

Under such circumstances, in recent years, an aluminum alloy substrate for a magnetic disk, which has high strength and a characteristic of small disk flutter, is strongly desired and being studied. For example, it has been proposed to mount an airflow suppression component having a plate opposed to a disk in a hard disk drive. Patent Literature 1 proposes a magnetic disk device having an air spoiler disposed upstream of an actuator. The air spoiler weakens the airflow toward the actuator on the magnetic disk to thereby reduce vibration of the magnetic disk caused by wind turbulence. Further, the air spoiler weakens the airflow on the magnetic disk to thereby suppress disk flutter. Further, Patent Literature 2 proposes a method for improving the strength of the aluminum alloy sheet by increasing the content of Mg that contributes to the improvement of the strength.

However, the method disclosed in Patent Literature 1 is different in the fluttering suppression effect depending on a difference in spacing between the installed air spoiler and the magnetic disk substrate, and requires the high precision of components, which gives rise to an increase in the cost of the components.

The method for increasing the Mg content, disclosed in Patent Literature 2, is effective in improving the strength of the aluminum alloy sheet, but disk flutter is liable to occur, and hence the goal of a reduced disk flutter characteristic has not been attained yet.

CITATION LIST

Patent Literature

Patent Literature 1: Unexamined Japanese Patent Application Publication No. 2002-313061
Patent Literature 2: Unexamined Japanese Patent Application Publication No. 2006-241513

SUMMARY OF INVENTION

Technical Problem

The present disclosure was made under such actual circumstances with an objective to provide an aluminum alloy sheet for a magnetic disk, which has high strength and is excellent in the fluttering characteristic of the magnetic disk, a method for producing the same, and a magnetic disk using the aluminum alloy sheet for a magnetic disk.

Solution to Problem

The present disclosure describes an aluminum alloy sheet for a magnetic disk, including an aluminum alloy comprising 0.10 to 3.00 mass % of Fe, 0.1 to 3.0 mass % of Mn, 0.003 to 1.000 mass % of Cu, and 0.005 to 1.000 mass % of Zn, with a balance of Al and unavoidable impurities, wherein second phase particles having a maximum diameter of 100 μm or more and 300 μm or less are dispersed at a distribution density of 50 particles/mm$^2$ or less in a region (A) occupying 25% or less of a sheet thickness from a sheet thickness center plane to opposite surfaces of the sheet, second phase particles having a maximum diameter of 100 μm or more and 300 μm or less are 0 particles/mm$^2$ in a region (C) that is obtained by excluding the region (A) from a region (B) occupying 50% or less of the sheet thickness from the sheet thickness center plane to the opposite surfaces of the sheet, and the amount of Mn solid solution is 0.03 mass % or more.

The present disclosure further describes that the aluminum alloy further comprises one or more elements selected from a group comprising 0.1 to 0.4 mass % of Si, 0.1 to 3.0 mass % of Ni, 0.1 to 6.0 mass % of Mg, 0.01 to 1.00 mass % of Cr, and 0.01 to 1.00 mass % of Zr.

The present disclosure further describes that the aluminum alloy further comprises one or more elements selected from a group comprising Ti, B, and V, of which a total content is 0.005 to 0.500 mass %.

The present disclosure further describes a magnetic disk wherein an electroless Ni—P plating-treated layer and a magnetic substance layer thereon are provided on a surface of an aluminum alloy substrate comprising the aluminum alloy sheet for a magnetic disk.

The present disclosure further describes a method for producing the aluminum alloy sheet for a magnetic disk, the method including a continuous casting step of continuously casting a cast plate using the aluminum alloy, and a cold rolling step of cold-rolling the cast plate, wherein in the casting step, the flow rate of molten metal flowing in a gutter for supplying a casting section for casting a casting plate is set to 100 kg/minute or lower, and also, a molten metal surface height is set to 30 mm or less and the casting speed is set to 0.4 to 1.5 m/minute.

The present disclosure further describes that the method may further include a homogenization treatment step of heating the cast plate at 300 to 450° C. for 0.5 to 24 hours, between the continuous casting step and the cold rolling step.

The present disclosure further describes that the method may further include an annealing treatment step of annealing the cast plate or cold-rolled sheet before or in the middle of the cold rolling.

Advantageous Effects of Invention

The present disclosure makes it possible to provide an aluminum alloy sheet for a magnetic disk, which has high strength and is excellent in the fluttering characteristic of the magnetic disk, a method for producing the same, and a magnetic disk using the aluminum alloy sheet for a magnetic disk.

DESCRIPTION OF EMBODIMENTS

Figure 1:
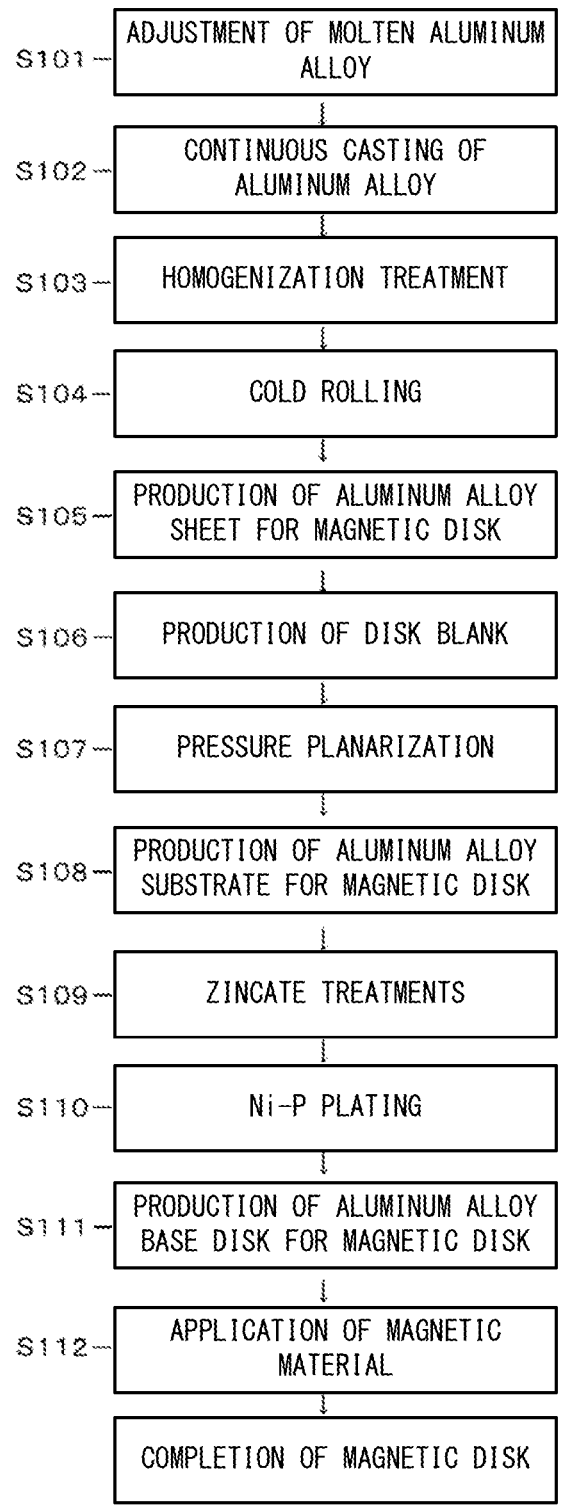
FIG. 1 is a flow diagram showing a method for producing an aluminum alloy sheet for a magnetic disk and the magnetic disk according to the present disclosure.

A magnetic disk according to the present disclosure uses an aluminum alloy sheet for a magnetic disk, according to the present disclosure, as a material. First, the aluminum alloy sheet for a magnetic disk is made. Then, the aluminum alloy sheet for a magnetic disk is stamped into a disk blank having an annular shape and the disk blank is pressure-annealed to make a blank, whereafter the blank is worked by lathing and griding into an aluminum alloy substrate for a magnetic disk. Further, the aluminum alloy substrate for a magnetic disk is subjected to degreasing, etching, zincate treatment, and Ni—P plating into an aluminum alloy base disk for a magnetic disk. Finally, a magnetic substance layer is provided on the aluminum alloy base disk for a magnetic disk to thereby form a magnetic disk.

The present inventors have focused on relationships between the strength and fluttering characteristic of a magnetic disk, and an aluminum alloy sheet as a base material, and intensively studied the relationships. As a result, the inventors have found that Fe and Mn contents and an amount of Mn solid solution in the aluminum alloy sheet have significant influence on the strength of the magnetic disk. Also, the inventors have found that the Fe content and second phase particles in the aluminum alloy sheet have significant influence on the fluttering characteristic of the magnetic disk, which is measured in air or in helium.

So, the present inventors have studied, in the aluminum alloy sheet for a magnetic disk, Fe and Mn contents, and second phase particles having a maximum diameter of 100 μm or more and 300 μm or less in a sheet thickness direction as a metallographic structure. As a result, the inventors have found that by using, as a base material, an aluminum alloy sheet for a magnetic disk, which contains 0.1 to 3.0 mass % (hereinafter, simplified as "%") of Fe and 0.1 to 3.0% of Mn, with second phase particles having a maximum diameter of 100 μm or more and 300 μm or less being dispersed at a distribution density of 50 particles/mm$^2$ or less in a region (A) occupying 25% or less of a sheet thickness from a sheet thickness center plane to opposite surfaces of the sheet, second phase particles having a maximum diameter of 100 μm or more and 300 μm or less being 0 particles/mm$^2$ in a region (C) that is obtained by excluding the region (A) from a region (B) occupying 50% or less of the sheet thickness from a sheet thickness central portion to the opposite surfaces of the sheet, and further an amount of Mn solid solution being 0.03% or more, the strength and fluttering characteristic of the magnetic disk are improved, and thus completed the present disclosure.

A. Aluminum Alloy Sheet for a Magnetic Disk, According to the Present Disclosure Hereinafter, the aluminum alloy sheet for a magnetic disk, according to the present disclosure, (hereinafter referred to as "the aluminum alloy sheet according to the present disclosure" or simply as "the aluminum alloy sheet") will be described in detail.

1. Alloy Composition

Hereinafter, aluminum alloy components constituting an aluminum alloy sheet in which Al—Fe—Mn-based alloys are used, according to the present disclosure, and contents thereof will be described.

Fe:

Fe is an essential element, which exists principally in the form of second phase particles (Al—Fe-based intermetallic compounds and the like) that are partly solid-dissolved in a matrix, and has the effect of improving the strength and fluttering characteristic of the magnetic disk. When vibrations are applied to such a material, vibrational energy is immediately absorbed due to viscous flow in the interface between the second phase particles and the matrix, to give a very favorable fluttering characteristic to the material. An Fe content of less than 0.10% in the aluminum alloy does not give sufficient strength and fluttering characteristic. On the other hand, an Fe content of more than 3.00% causes generation of a large number of coarse Al—Fe-based intermetallic compounds particles. The coarse Al—Fe-based intermetallic compounds particles drop off during etching, zincate treatment, lathing, and grinding, to form large recesses, thereby causing deterioration of the smoothness of the plated surface and plating peeling. Further, this causes lowering of workability in a rolling step. Accordingly, the content of Fe in the aluminum alloy is set in a range of 0.10 to 3.0%. The content of Fe is preferably in a range of 0.40 to 2.00%, more preferably in a range of 0.80 to 1.80%.

Mn:

Mn is an essential element, which exists principally as second phase particles (Al—Mn-based intermetallic compounds and the like) and a solid solution element, and has the effect of improving the strength and fluttering characteristic of the magnetic disk. When vibrations are applied to such a material, vibrational energy is immediately absorbed due to viscous flow in the interface between the second phase particles and the matrix to give a very favorable fluttering characteristic to the material. A Mn content of less than 0.10% in the aluminum alloy does not give sufficient strength and fluttering characteristic. On the other hand, a Mn content of more than 3.00% causes generation of a large number of coarse Al—Mn-based intermetallic compounds particles. The coarse Al—Mn-based intermetallic compounds particles drop off during etching, zincate treatment, lathing, and grinding, to form large recesses, thereby causing deterioration of the smoothness of the plated surface and plating peeling. Further, this causes lowering of workability in the rolling step. Accordingly, the content of Mn in the aluminum alloy is set in a range of 0.1 to 3.0%. The content of Mn is preferably in a range of 0.2 to 1.0%, more preferably in a range of 0.2 to 0.8%.

Cu:

Cu is an essential element, which reduces the amount of dissolution of Al during zincate treatment, and causes a zincate film to be uniformly, thinly, and closely attached, to thereby have the effect of improving the smoothness and adhesion in the following plating step. A Cu content of less than 0.003% in the aluminum alloy causes the zincate film to be non-uniform and pits to be formed in the plated surface, thereby lowering the smoothness of the plated surface. Further, plating peeling is made liable to occur. On the other hand, a Cu content of more than 1.000% in the aluminum alloy causes generation of a large number of coarse Al—Cu-based intermetallic compounds particles. The coarse Al—Cu-based intermetallic compounds particles drop off during etching, zincate treatment, lathing, and grinding, to form large recesses, thereby forming pits in the plated surface and causing deterioration of the smoothness of the plated surface. Further, plating peeling is made liable to occur. Accordingly, the content of Cu in the aluminum alloy is set in a range of 0.003 to 1.000%. The content of Cu is preferably in a range of 0.005 to 0.400%.

Zn:

Zn is an essential element, which reduces the amount of dissolution of Al during zincate treatment, and causes a zincate film to be uniformly, thinly, and closely attached, to thereby have the effect of improving the smoothness and adhesion in the following plating step. A Zn content of less than 0.005% in the aluminum alloy causes the zincate film to be non-uniform and pits to be formed in the plated surface, thereby lowering the smoothness of the plated surface. Further, plating peeling is made liable to occur. On the other hand, a Zn content of more than 1.000% in the aluminum alloy causes the zincate film to be non-uniform and pits to be formed in the plated surface, thereby lowering the smoothness of the plated surface. Further, plating peeling is made liable to occur. Accordingly, the content of Zn in the aluminum alloy is set in a range of 0.005 to 1.000%. The content of Zn is preferably in a range of 0.100 to 0.700%.

To improve the strength and fluttering characteristic of the magnetic disk, one or more elements selected from 0.1 to 0.4% of Si, 0.1 to 3.0% of Ni, 0.1 to 6.0% of Mg, 0.01 to 1.00% of Cr, and 0.01 to 1.00% of Zr may be further contained as first selective elements. Further, one or more elements selected from Ti, B, and V, of which a total content is 0.005 to 0.500%, may be further contained as second selective elements. These selective elements will be described below.

Si:

Si exists principally as second phase particles (Si particles and the like) and has the effect of improving the strength and fluttering characteristic of the magnetic disk. When vibrations are applied to such a material, vibrational energy is immediately absorbed due to viscous flow in the interface between the second phase particles and the matrix, to give a very favorable fluttering characteristic to the material. A Si content of 0.1% or more in the aluminum alloy has a more increased effect of improving the strength and fluttering characteristic of the magnetic disk. Further, a Si content of 0.4% or less in the aluminum alloy suppresses generation of a large number of coarse Si particles. It is possible to suppress the coarse Si particles from dropping off during etching, zincate treatment, lathing, and grinding to form large recesses and further suppress lowering of the smoothness of the plated surface and occurrence of plating peeling. Further, it is possible to further suppress lowering of workability in the rolling step. Accordingly, the content of Si in the aluminum alloy is preferably set in a range of 0.1 to 0.4%, and is more preferably set in a range of 0.1 to 0.3%.

Ni:

Ni exists principally as second phase particles (Al—Ni-based intermetallic compounds and the like) and has the effect of improving the strength and fluttering characteristic of the magnetic disk. When vibrations are applied to such a material, vibrational energy is immediately absorbed due to viscous flow in the interface between the second phase particles and the matrix, to give a very favorable fluttering characteristic to the material. A Ni content of 0.1% or more in the aluminum alloy has a more increased effect of improving the strength and fluttering characteristic of the magnetic disk. Further, a Ni content of 3.0% or less in the aluminum alloy suppresses generation of a large number of coarse Al—Ni-based intermetallic compounds particles. It is possible to suppress such coarse Al—Ni-based intermetallic compounds particles from dropping off during etching, zincate treatment, lathing, and grinding to form large recesses and further suppress lowering of the smoothness of the plated surface and occurrence of plating peeling. Further, it is possible to further suppress lowering of workability in the rolling step. Accordingly, the content of Ni in the aluminum alloy is preferably set in a range of 0.1 to 3.0%, and is more preferably set in a range of 0.1 to 1.0%.

Mg:

Mg exists principally as second phase particles (Mg—Si-based intermetallic compounds and the like) and has the effect of improving the strength and fluttering characteristic of the magnetic disk. A Mg content of 0.1% or more in the aluminum alloy has a more increased effect of improving the strength and fluttering characteristic of the magnetic disk. Further, a Mg content of 6.0% or less in the aluminum alloy suppresses generation of a large number of coarse Mg—Si-based intermetallic compounds particles. It is possible to suppress such coarse Mg—Si-based intermetallic compounds particles from dropping off during etching, zincate treatment, lathing, and grinding to form large recesses and further suppress lowering of the smoothness of the plated surface and occurrence of plating peeling. Further, it is possible to further suppress lowering of workability in the rolling step. Accordingly, the content of Mg in the aluminum alloy is preferably set in a range of 0.1 to 6.0%, and is more preferably set in a range of 0.3 or more and less than 1.0%.

Cr:

Cr exists principally as second phase particles (Al—Cr-based intermetallic compounds and the like) and has the effect of improving the strength and fluttering characteristic of the magnetic disk. A Cr content of 0.01% or more in the aluminum alloy has a more increased effect of improving the strength and fluttering characteristic of the magnetic disk. Further, a Cr content of 1.00% or less in the aluminum alloy suppresses generation of a large number of coarse Al—Cr-based intermetallic compounds particles. It is possible to suppress such coarse Al—Cr-based intermetallic compounds particles from dropping off during etching, zincate treatment, lathing, and grinding to form large recesses and further suppress lowering of the smoothness of the plated surface and occurrence of plating peeling. Further, it is possible to further suppress lowering of workability in the rolling step. Accordingly, the content of Cr in the aluminum alloy is preferably set in a range of 0.01 to 1.00%, and is more preferably set in a range of 0.10 to 0.50%.

Zr:

Zr exists principally as second phase particles (Al—Zr-based intermetallic compounds and the like) and has the effect of improving the strength and fluttering characteristic of the magnetic disk. A Zr content of 0.01% or more in the aluminum alloy has a more increased effect of improving the strength and fluttering characteristic of the magnetic disk. Further, a Zr content of 1.00% or less in the aluminum alloy suppresses generation of a large number of coarse Al—Zr-based intermetallic compounds particles. It is possible to suppress such coarse Al—Zr-based intermetallic compounds particles from dropping off during etching, zincate treatment, lathing, and grinding to form large recesses and further suppress lowering of the smoothness of the plated surface and occurrence of plating peeling. Further, it is possible to further suppress lowering of workability in the rolling step. Accordingly, the content of Zr in the aluminum alloy is preferably set in a range of 0.01 to 1.00%, and is more preferably set in a range of 0.10 to 0.50%.

Ti, B, V:

Ti, B, V form, in a solidification process in casting, second phase particles (particles of borides, such as $TiB_2$, $Al_3Ti$, Ti-V-B, and the like), which become crystal grain nuclei, and therefore it is possible to make crystal grains finer. As a result, plating properties are improved. Further, finer crystal grains reduce the non-uniformity of the sizes of the second phase particles and unevenness in the strength and fluttering characteristic of the magnetic disk. However, it is impossible to obtain the above-described effects when the total of the contents of Ti, B, and V is less than 0.005%. On the other hand, even when the total of the contents of Ti, B, and V is more than 0.500%, the effects are saturated, and therefore, it is impossible to obtain more noticeable improvement effects than the above. Accordingly, when Ti, B and V are added, the total of the contents of Ti, B, and V is preferably set in a range of 0.005 to 0.500%, and is more preferably set in a range of 0.005 to 0.100%. Note that the total refers to the total of only one element of the elements when the one element is contained, to the total of only two elements of the elements when the two elements are contained, and to the total of the three elements when all the elements are contained.

Other Elements

The balance of the aluminum alloy for use in the present disclosure comprises Al and unavoidable impurities. Here, as the unavoidable impurities, there may be mentioned Ga and Sn, and the characteristics of the aluminum alloy sheet obtained in the present disclosure are not spoiled when each content is less than 0.10% and also the total content is less than 0.20%.

2. Distribution State of Second Phase Particles

Next, a distribution state of second phase particles in the aluminum alloy sheet according to the present disclosure will be described.

In the aluminum alloy sheet according to the present disclosure, in a metallographic structure thereof, second phase particles having a maximum diameter of 100 μm or more and 300 μm or less are dispersed at a distribution density of 50 particles/mm$^2$ or less in a region (A) occupying 25% or less of a sheet thickness from a sheet thickness center plane to opposite surfaces of the sheet, and the distribution density of second phase particles having a maximum diameter of 100 μm or more and 300 μm or less in a region (C) that is obtained by excluding the region (A) from a region (B) occupying 50% or less of the sheet thickness from the sheet thickness central plane toward the opposite surfaces of the sheet is 0 particles/mm$^2$.

Figure 2:
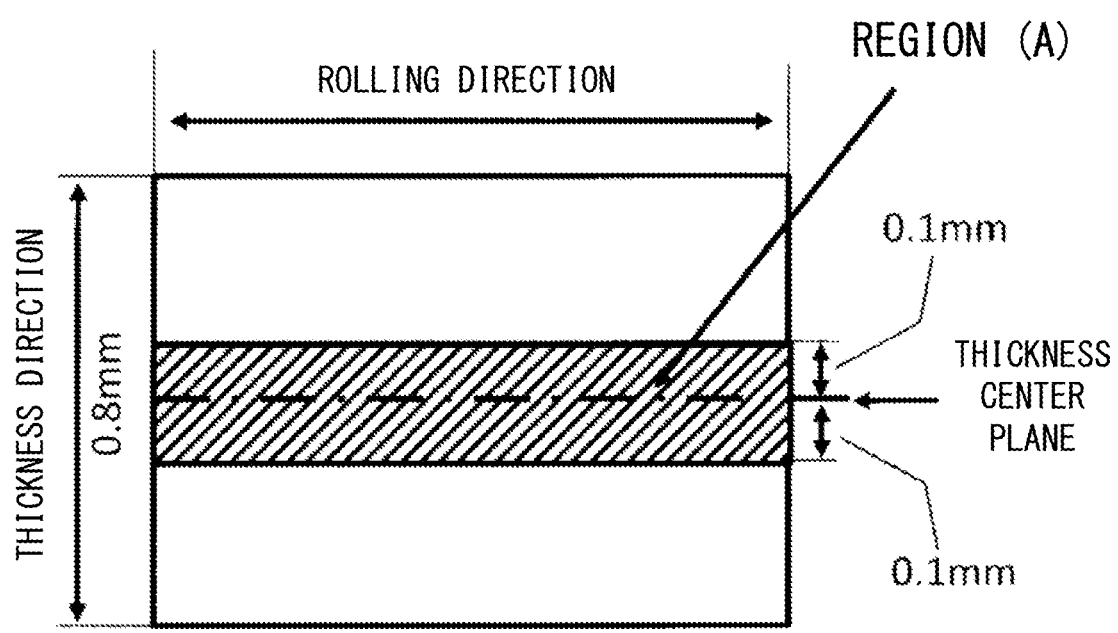
FIG. 2 is a schematic diagram showing a region (A) in an aluminum alloy sheet for a magnetic disk according to the present disclosure, which has a sheet thickness of 0.8 mm.
Figure 3:
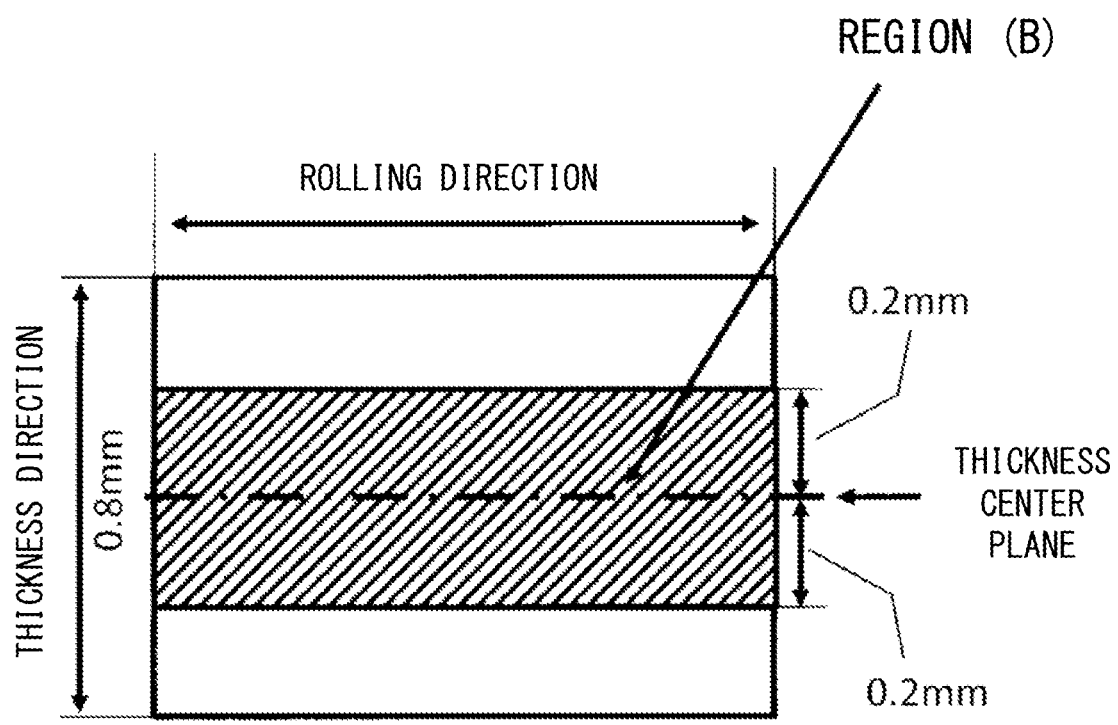
FIG. 3 is a schematic diagram showing a region (B) in an aluminum alloy sheet for a magnetic disk according to the present disclosure, which has a sheet thickness of 0.8 mm.
Figure 4:
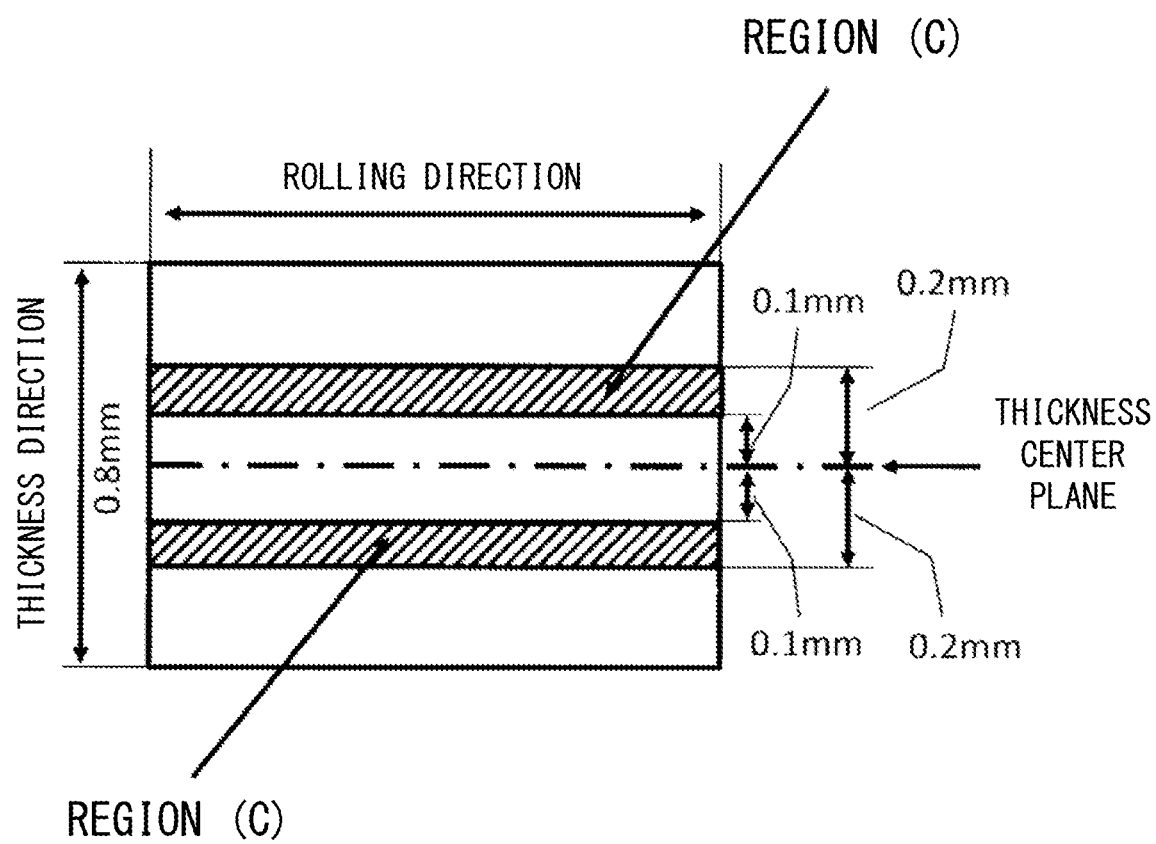
FIG. 4 is a schematic diagram showing a region (C) in an aluminum alloy sheet for a magnetic disk according to the present disclosure, which has a sheet thickness of 0.8 mm.

Note that the region (A) is shown in FIG. 2. Referring to FIG. 2, there is illustrated an example in which the region (A) extends from the sheet thickness center plane toward the opposite surfaces of the sheet over a thickness of 0.1 mm+0.1 mm=0.2 mm, and occupies 25% ({0.2/0.8}×100) of the sheet thickness (0.8 mm). Further, the region (B) is shown in FIG. 3. Referring to FIG. 3, there is illustrated an example in which the region (B) extends from the sheet thickness center plane toward the opposite surfaces of the sheet over a thickness of 0.2 mm+0.2 mm=0.4 mm, and occupies 50% ({0.4/0.8}×100) of the sheet thickness (0.8 mm). Further, the region (C) is shown in FIG. 4. Referring to FIG. 4, the region (C) is a portion that is obtained by excluding the region (A) from the region (C) and consists of two portions separated from each other by the region (A) therebetween. The portions are regions extending toward the surfaces of the sheet each over a thickness of 0.2 mm–0.1 mm=0.1 mm.

Here, the second phase particles mean precipitates and crystals, and specifically, refer to Al—Fe-based intermetallic compounds ($Al_3Fe$, $Al_6Fe$, $Al_6(Fe, Mn)$, Al—Fe—Si, Al—Fe—Mn—Si, Al—Fe—Ni, Al—Cu—Fe, and the like), Al—Mn-based intermetallic compounds ($Al_6Mn$, A-Mn—Si), Si particles, Al—Ni-based intermetallic compounds ($Al_3Ni$ and the like), Al—Cu-based intermetallic compounds ($Al_2Cu$ and the like), Mg—Si-based intermetallic compounds ($Mg_2Si$ and the like), Al—Cr-based intermetallic compounds ($Al_7Cr$ and the like), Al—Zr-based intermetallic compounds ($Al_3Zr$ and the like), and the like.

In the metallographic structure of the aluminum alloy sheet according to the present disclosure, the second phase particles having a maximum diameter of 100 μm or more and 300 μm or less are dispersed at a distribution density of 50 particles/$mm^2$ or less in the region (A) occupying 25% or less of the sheet thickness from the sheet thickness center plane toward the opposite surfaces of the sheet, and the distribution density of second phase particles having a maximum diameter of 100 μm or more and 300 μm or less in the region (C) that is obtained by excluding the region (A) from the region (B) occupying 50% or less of the sheet thickness from the sheet thickness central plane toward the opposite sheet is 0 particles/$mm^2$. This improves the flatness of the aluminum alloy sheet and exhibits an excellent fluttering characteristic. The second phase particles are much higher in hardness than an Al matrix, and therefore if coarse second phase particles exist in a thickness central portion or thereabouts, it is impossible to obtain a favorable flatness even if pressure annealing is performed. A magnetic disk made by using such an aluminum alloy material having such large flatness variation has large air resistance during operation thereof and is lowered in the fluttering characteristic. On the other hand, a magnetic disk made by using the aluminum alloy having small flatness variation can suppress lowering of the fluttering characteristic.

In the metallographic structure of the aluminum alloy sheet according to the present disclosure, when the second phase particles having a maximum diameter of 100 μm or more and 300 μm or less are dispersed at a distribution density of more than 50 particles/$mm^2$ in the region (A) occupying 25% or less of the sheet thickness from the sheet thickness center plane to the opposite surfaces of the sheet, a large number of coarse second phase particles exist and therefore it is impossible to obtain a favorable flatness even if pressure annealing is performed. Therefore, air resistance during operation of a magnetic disk device is large, which lowers the fluttering characteristic thereof. Note that the distribution density of the second phase particles in the region (A) is preferably 25 particles/$mm^2$ or less. Further, the lower limit value of the distribution density of the second phase particles is not particularly limited, but is naturally determined according to an aluminum alloy used therefor and a method for producing the same. In the present disclosure, the lower limit value is about one particle/$mm^2$.

In the region (C) that is obtained by excluding the region (A) from the region (B) occupying 50% or less of the sheet thickness from the sheet thickness central plane to the opposite surfaces of the sheet, when the distribution density of second phase particles having a maximum diameter of 100 μm or more and 300 μm or less is more than 0 particles/$mm^2$, that is, even one second phase particle exists, it is impossible to obtain a favorable flatness even if pressure annealing is performed. Therefore, air resistance during operation of the magnetic disk device is large, so that the fluttering characteristic is lowered. As described above, in the region (A), so long as the distribution density of coarse second phase particles is 50 particles/$mm^2$ or less, the coarse second phase particles pose no problem, but in the region (C), the distance from the sheet thickness center plane is large and therefore the coarse second phase particles have a significant influence on the flatness, so that even one coarse second phase particle makes it impossible to obtain a favorable flatness.

Not that in the regions (A) and (C), the maximum diameter of the second phase particles to be controlled is set to 100 μm or more and 300 μm or less for the following reason: Second phase particles having a maximum diameter of less than 100 μm are small in size and therefore do not much affect the flatness. On the other hand, second phase particles having a maximum diameter of more than 300 μm form holes opened from the second phase terminals as starting points during cold rolling, which make the resulting magnetic disk a non-conforming product, rather than affect the flatness. Accordingly, the maximum diameter of the second phase particles to be controlled is set to 100 μm or more and 300 μm or less.

In the present disclosure, the maximum diameter of the second phase is determined as follows: First, in a planar image obtained by an optical microscope, the largest value of the distances between a point on the outline and the other points on the outline is measured, and then such largest values are measured for all the points on the outline. Finally, the maximum value selected from all of the largest values is determined as the maximum diameter.

Amount of Solid Solution of Mn

Next, the amount of solid solution of Mn in the aluminum alloy sheet according to the present disclosure will be described.

In the aluminum alloy sheet according to the present disclosure, the amount of solid solution of Mn is defined as 0.03% or more. When the amount of solid solution of Mn is 0.03% or more, the yield strength of the aluminum alloy sheet is improved by solid solution strengthening. When the yield strength of the aluminum alloy sheet is low, an external force applied to a magnetic disk during transit or mounting thereof causes deformation of the magnetic disk, which lowers the fluttering characteristic. Note that the upper limit of the amount of solid solution of Mn is not particularly limited, but is naturally determined according to an alloy composition and producing conditions. In the present disclosure, the upper limit is about 1.00%. Accordingly, the amount of solid solution of Mn is set to 0.03% or more. The amount of solid solution of Mn is preferably set to 0.05% or more.

4. Thickness

In the embodiment of the present disclosure, it is preferable that the thickness of the aluminum alloy sheet is 0.35 mm or more. When the thickness of the aluminum alloy sheet is less than 0.35 mm, there is a possibility of being deformed by acceleration caused by a fall which can occur when the hard disk drive is mounted, except that the deformation can be suppressed by increasing the yield strength. Note that a thickness of more than 1.90 mm of the aluminum alloy sheet improves the fluttering characteristic but reduces the number of disks which can be mounted in the hard disk and therefore is unsuitable. Accordingly, the thickness of the aluminum alloy sheet is more preferably set to a range of 0.35 to 1.90 mm, and is further preferably set to a range of 0.50 to 1.40 mm.

B. Method for Producing the Aluminum Alloy Sheet According to the Present Disclosure Steps of a process for producing the aluminum alloy sheet according to the present disclosure and process conditions will be described in detail below. A method for producing the aluminum alloy sheet and the magnetic disk according to the present disclosure will be described with reference to a flowchart shown in FIG. 1. Here, the aluminum alloy sheet is made by steps of adjustment of molten aluminum alloy (step S101) to cold roll (step S104).

1. Adjustment and Casting of Molten Aluminum Alloy

First, a molten aluminum alloy material having a composition described above is prepared by heating and melting according to a usual method (step S101). Then, the prepared molten aluminum alloy material is cast by a continuous casting (CC) method into a cast plate which is a plate of aluminum alloy having a thickness of about 2.0 to 10.0 mm (step S102).

Here, according to the CC method, molten metal is supplied, through a casting nozzle, between a pair of rolls (or a belt caster or a block caster, hereinafter referred to as "rolls and the like or "casting section for forming a cast sheet), and by performing heat removal from the rolls and the like, a cast plate of aluminum alloy is directly cast. Thus, the casting nozzle is disposed on a molten metal inlet side of the casting section for forming the cast sheet, and the casting nozzle is supplied with molten metal from a melting furnace by a gutter disposed upstream of the casting nozzle. In the casting of the cast sheet of aluminum alloy by the CC method, the flow rate of molten metal flowing in the gutter is set to 100 kg/minute, the molten metal surface height is set to 30 mm or less at the same time, and the casting speed is set to 0.4 to 1.5 m/minute. By performing casting under such conditions described above, it is possible to reduce the number of coarse second phase particles existing in a sheet thickness center and its vicinity or therearound and also increase the amount of Mn solid solution. Therefore, it is possible to enhance the effects of improving fluttering characteristic and strength.

The CC method is much higher in the cooling rate during solidification than the semi-continuous casting (DC) method, but there is a possibility that coarse second phase particles are generated in the sheet thickness center and its vicinity or therearound. To suppress generation of such coarse second phase particles, it is required to control the surface height of the molten metal flowing in the gutter and the casting speed.

When the flow rate of molten metal flowing in the gutter is more than 100 kg/minute, the pressure of molten metal becomes high and the molten metal is cooled non-uniformly when the molten metal is cooled by the rolls and the like. As a result, a large number of second phase particles having a maximum diameter of 100 μm or more and 300 μm or less are generated in the region (C) and it is impossible to obtain a favorable flatness even if pressure annealing is performed, so that air resistance during operation of the magnetic disk device becomes large, resulting in lowering of the fluttering characteristic. Therefore, the flow rate of the molten metal flowing in the gutter is defined as 100 kg/minute or lower. Note that the flow rate of the molten metal flowing in the gutter is preferably set to 50 kg/minute or lower Further, the lower limit of the flow rate of the molten metal flowing in the gutter is not particularly limited, but when it is lower than 1 kg/minute, due to a low flow rate of the molten metal, there is a possibility that the temperature of the molten metal immediately lowers to cause the molten metal to solidify before being brought into contact with the rolls and the like, which makes it impossible to perform casting. Therefore, the flow rate of molten metal flowing in the gutter is preferably 1 kg/m or higher. On the other hand, when the surface height of the molten metal flowing in the gutter is more than 30 nm from the bottom of the gutter, the pressure of the molten metal becomes high, causing non-uniform cooling when the molten metal is cooled by the rolls and the like. As a result, in the region (C), a large number of second phase particles having a maximum diameter of 100 μm or more and 300 μm or less are generated, so that even when the cast sheet is subjected to pressure annealing, a favorable flatness cannot be obtained, so that air resistance during operation of the magnetic disk device becomes large, resulting in lowering of the fluttering characteristic. Therefore, the surface height of the molten metal flowing in the gutter disposed upstream of the nozzle disposed on the molten metal inlet side of the casting rolls and the like is defined as 30 mm or less from the bottom of the gutter. Note that the surface height of the molten metal is preferably set to 25 mm or less. Note that the lower limit of the surface height of the molten metal is not particularly limited, but when it is less than 5 mm, there is a possibility that the flow rate of molten metal is so low that the temperature of the molten metal immediately lowers to cause the molten metal to solidify before being brought into contact with the rolls and the like, which makes it impossible to perform casting. Therefore, the surface height of the molten metal is preferably 5 mm μm or more.

When the casting speed is 0.4 m/minute or lower, the casting speed is so low that the temperature of molten metal immediately lowers. As a result, the molten metal solidifies before being brought into contact with the rolls and like, which makes it impossible to perform casting. On the other hand, the casting speed is 1.5 m/minute or higher, a large number of second phase particles having a maximum diameter of 100 μm or more and 300 μm or less are generated in the region (A), so that even when pressure annealing is performed, it is impossible to obtain a favorable flatness, so that air resistance during operation of the magnetic disk device becomes large, resulting in lowering of the fluttering characteristic. Further, when the casting speed is 1.5 m/minute or higher, the lowering rate of molten metal becomes low, so that the amount of Mn solid solution becomes small, which makes it impossible to obtain a sufficient yield strength. Therefore, the casting speed is defined as 0.4 to 1.5 m/minute. Note that the casting speed is preferably set to 0.5 to 1.2 m/minute.

2. Cold Rolling

Next, the cast sheet is cold-rolled (step S104) and an aluminum alloy sheet having a thickness of about 1.8 mm to 0.35 mm is made (step S105). The cast sheet is completed by cold rolling such that it has a desired product thickness. Conditions for cold rolling are not particularly limited, but are only required to be determined according to the required product strength and thickness of the aluminum sheet alloy, and it is preferable that the rolling reduction ratio is set to 10 to 95%. Note that before cold rolling or in the middle of cold rolling, annealing may be performed to secure cold rolling workability. In the case of carrying out the annealing treatment, for example, by batch type heating, it is preferable to carry out under conditions of 200° C. or higher and 380° C. or lower for 0.1 to 10 hours, and by continuous type heating, it is preferable to carry out under the conditions of 300° C. or higher and 600° C. or lower and 0 to 60 seconds for holding. Here, the holding time of 0 seconds by the continuous type means that cooling is executed by immediately stopping heating after reaching a desired treatment temperature.

3. Homogenization Treatment

Next, a homogenization treatment step may be executed between the continuous casting step and the cold rolling step as needed (step S103). Heating treatment conditions of the homogenization treatment step are 300 to 450° C. for 0.5 to 24 hours, preferably 310 to 440° C. for 0.5 to 20 hours.

C. Aluminum Alloy Substrate for Magnetic Disk According to the Present Disclosure Next, using the aluminum alloy sheet in the step 5, by making a disk blank (step S106) and performing pressure flattening treatment (step S107), an aluminum alloy substrate for a magnetic disk (hereinafter, referred to as "aluminum alloy substrate") is made (step S108). First, the aluminum alloy sheet is stamped into an annular shape to form a disk blank (step S106), Next, the disk blank is pressure annealed in the atmosphere, for example, at 100° C. or higher and 350° C. or lower for 30 minutes or longer, to thereby form a flattened blank (step S107). Next, the blank is subjected to lathing and grinding, and preferably to heat treatment for strain removal at a temperature of 250 to 400° C. for 5 to 15 minutes, in this order, to thereby make an aluminum alloy substrate (step S108).

D. Aluminum Alloy Base Disk for Magnetic Disk According to the Present Disclosure Next, after the surface of the aluminum alloy substrate obtained at the step S is subjected to degreasing, acid etching, and desmutting, the surface was subjected to zincate treatment (Zn substitution treatment) (step S109). Further, the surface of the aluminum alloy substrate subjected to the zincate treatment is subjected to Ni—P plating as undercoat treatment (step S110). Thus, the aluminum alloy base disk is made (step S111).

It is preferable that degreasing treatment is performed by using a commercially available degreasing solution of AD-68F (made by C. Uyemura & Co., Ltd.), under the conditions of a temperature of 40 to 70° C., a treatment time of 3 to 10 minutes, and a concentration of 200 to 800 mL/L. Acid etching treatment is performed by using a commercially available degreasing solution of AD-107F (made by C. Uyemura & Co., Ltd.), under the conditions of a temperature of 50 to 75° C., a treatment time of 0.5 to 5 minutes, and a concentration of 20 to 100 mL/L. After the acid etching treatment, desmutting treatment is preferably performed using $HNO_3$ under the conditions of a temperature of 15 to 40° C., a treatment time of 10 to 120 seconds, and a concentration of 10 to 60%.

1st zincate treatment is performed by using a commercially available zincate treatment solution of AD-301F-3X (made by C. Uyemura & Co., Ltd.), under the conditions of a temperature of 10 to 35° C., a treatment time of 0.1 to 5 minutes, and a concentration of 100 to 500 mL/L. After the 1st zincate treatment, it is preferable to perform Zn peeling treatment using $HNO_3$ under conditions of a temperature of 15 to 40° C., a treatment time of 10 to 120 seconds, and a concentration of 10 to 60%. Thereafter, 2nd zincate treatment is carried out under the same conditions as the 1st zincate treatment.

An electroless Ni—P plating step is performed as undercoat plating treatment on the surface of the 2nd zincate-treated aluminum alloy substrate (S110). Electroless Ni—P plating is preferably performed using a commercially available plating solution of Nimden HDX (made by C. Uyemura & Co., Ltd.) or the like, under conditions of a temperature of 80 to 95° C., a treatment time of 30 to 180 minutes, a Ni concentration of 3 to 10 g/L. Through the electroless Ni—P plating step, an aluminum alloy base disk subjected to the undercoat plating treatment is obtained.

E. Magnetic Disk

Finally, a magnetic disk is made by performing a step in which the surface of the aluminum alloy base disk subjected to the undercoat plating treatment is smoothed by polishing, and a magnetic medium including an undercoat layer, a magnetic layer, a protective film, a lubricant layer, and the like is deposited on the surface by sputtering (step S112).

Note that after the aluminum alloy sheet is made in the step S105 after the cold rolling step (step S104), the types, distribution, and solid solution amount of intermetallic compounds forming the second phase particles do not substantially change. Therefore, in place of the aluminum alloy sheet made in the step S105, the aluminum alloy substrate made in the step S108 after the pressure planarization step (step S107) or the aluminum alloy base disk made in the step S111 after the Ni—P plating step (S110), or the magnetic disk after the step of depositing the magnetic substance (step S112) may be used to evaluate the types, distribution, and solid solution amount of intermetallic compounds forming the second phase particles.

F. Fluttering Characteristic

The fluttering characteristic is affected also by the motor characteristics of a hard disk drive. In the present disclosure, the fluttering characteristic in air is preferably 50 nm or less, more preferably, 30 nm or less. When 50 nm or less, it is judged that the magnetic disk can withstand the use for general HDDs. When more than 50 nm, the positioning error of a head as a reader increases.

Further, the fluttering characteristic in helium is preferably 30 nm or less, more preferably, 20 nm or less. When 30 nm or less, it is judged that the magnetic disk can withstand the use for HDDs having a high density recording capacity. When more than 30 nm, the positioning error of the head as a reader increases.

Here, since the necessary fluttering characteristic differs depending on the hard disk drive used, the distribution state of the second phase particles may be determined as appropriate for the necessary fluttering characteristics. These can be obtained by appropriately adjusting the contents of additive elements described above, the casting method including the cooling rate at the time of casting, described hereinafter, and the heat history and work history by the subsequent heat treatment and working.

Note that the fluid force can be lowered by filling the hard disk with helium. This is because the gas viscosity of helium is as low as about ⅛ of that of air. Fluttering caused by the gas flow accompanying the rotation of the hard disk is reduced by reducing the fluid force of gas.

EMBODIMENTS

Hereafter, the present invention will be described in more detail with reference to Examples, which should not be construed as limiting the scope of the invention.

Each of alloy materials having respective compositions shown in Tables 1 to 3 was melted in accordance with a conventional method to prepare a molten aluminum alloy (step S101). In Tables 1 to 3, "-" indicates less than the measurement limit.

TABLE 1

ALLOY COMPOSITION (mass %)

| ALLOY No. | Fe | Mn | Cu | Zn | Si | Ni | Mg | Cr | Zr | Ti | B | V | Ti + B + V | Al + UNAVOIDABLE IMPURITIES |
|---|---|---|---|---|---|---|---|---|---|---|---|---|---|---|
| A1 | 0.10 | 0.2 | 0.020 | 0.230 | — | — | — | — | — | — | — | — | 0.000 | Bal. |
| A2 | 0.40 | 0.2 | 0.020 | 0.230 | — | — | — | — | — | — | — | — | 0.000 | Bal. |
| A3 | 0.60 | 0.2 | 0.020 | 0.230 | 0.2 | — | — | — | — | — | — | — | 0.000 | Bal. |
| A4 | 0.80 | 0.2 | 0.020 | 0.230 | — | 0.2 | — | — | — | — | — | — | 0.000 | Bal. |
| A5 | 1.00 | 0.2 | 0.020 | 0.230 | — | — | — | — | — | — | — | — | 0.000 | Bal. |
| A6 | 1.20 | 0.2 | 0.020 | 0.230 | — | — | 0.2 | — | — | — | — | — | 0.000 | Bal. |
| A7 | 1.50 | 0.2 | 0.020 | 0.230 | — | — | — | 0.20 | — | — | — | — | 0.000 | Bal. |
| A8 | 1.80 | 0.2 | 0.020 | 0.230 | — | — | — | — | 0.20 | — | — | — | 0.000 | Bal. |
| A9 | 2.00 | 0.2 | 0.020 | 0.230 | — | — | — | — | — | — | — | — | 0.000 | Bal. |
| A10 | 2.90 | 0.2 | 0.020 | 0.230 | — | — | — | — | — | 0.060 | 0.001 | 0.020 | 0.081 | Bal. |
| A11 | 1.50 | 0.1 | 0.020 | 0.230 | — | — | — | — | — | — | — | — | 0.000 | Bal. |
| A12 | 1.50 | 0.3 | 0.020 | 0.230 | — | — | — | — | — | — | — | — | 0.000 | Bal. |
| A13 | 1.50 | 0.6 | 0.020 | 0.230 | — | — | — | — | — | — | — | — | 0.000 | Bal. |
| A14 | 1.50 | 1.5 | 0.020 | 0.230 | — | — | — | — | — | — | — | — | 0.000 | Bal. |
| A15 | 1.50 | 2.9 | 0.020 | 0.230 | — | — | — | — | — | — | — | — | 0.000 | Bal. |
| A16 | 1.50 | 0.2 | 0.020 | 0.230 | 0.1 | — | — | — | — | — | — | — | 0.000 | Bal. |
| A17 | 1.50 | 0.2 | 0.020 | 0.230 | 0.4 | — | — | — | — | — | — | — | 0.000 | Bal. |
| A18 | 1.50 | 0.2 | 0.020 | 0.230 | — | 0.1 | — | — | — | — | — | — | 0.000 | Bal. |
| A19 | 1.50 | 0.2 | 0.020 | 0.230 | — | 1.0 | — | — | — | — | — | — | 0.000 | Bal. |
| A20 | 1.50 | 0.2 | 0.020 | 0.230 | — | 2.9 | — | — | — | — | — | — | 0.000 | Bal. |
| A21 | 1.50 | 0.2 | 0.003 | 0.230 | — | — | — | — | — | — | — | — | 0.000 | Bal. |
| A22 | 1.50 | 0.2 | 0.021 | 0.230 | — | — | — | — | — | — | — | — | 0.000 | Bal. |
| A23 | 1.50 | 0.2 | 0.151 | 0.230 | — | — | — | — | — | — | — | — | 0.000 | Bal. |
| A24 | 1.50 | 0.2 | 0.932 | 0.230 | — | — | — | — | — | — | — | — | 0.000 | Bal. |
| A25 | 1.50 | 0.2 | 0.020 | 0.230 | — | — | 0.1 | — | — | — | — | — | 0.000 | Bal. |
| A26 | 1.50 | 0.2 | 0.020 | 0.230 | — | — | 0.9 | — | — | — | — | — | 0.000 | Bal. |
| A27 | 0.40 | 0.2 | 0.020 | 0.230 | — | — | 6.0 | — | — | — | — | — | 0.000 | Bal. |
| A28 | 1.50 | 0.2 | 0.020 | 0.230 | — | — | — | 0.01 | — | — | — | — | 0.000 | Bal. |
| A29 | 1.50 | 0.2 | 0.020 | 0.230 | — | — | — | 0.15 | — | — | — | — | 0.000 | Bal. |
| A30 | 1.50 | 0.2 | 0.020 | 0.230 | — | — | — | 0.95 | — | — | — | — | 0.000 | Bal. |

TABLE 2

ALLOY COMPOSITION (mass %)

| ALLOY No. | Fe | Mn | Cu | Zn | Si | Ni | Mg | Cr | Zr | Ti | B | V | Ti + B + V | Al + UNAVOIDABLE IMPURITIES |
|---|---|---|---|---|---|---|---|---|---|---|---|---|---|---|
| A31 | 1.50 | 0.2 | 0.020 | 0.230 | — | — | — | — | 0.01 | — | — | — | 0.000 | Bal. |
| A32 | 1.50 | 0.2 | 0.020 | 0.230 | — | — | — | — | 0.15 | — | — | — | 0.000 | Bal. |
| A33 | 1.50 | 0.2 | 0.020 | 0.230 | — | — | — | — | 0.95 | — | — | — | 0.000 | Bal. |
| A34 | 1.50 | 0.2 | 0.020 | 0.005 | — | — | — | — | — | 0.052 | — | — | 0.052 | Bal. |
| A35 | 1.50 | 0.2 | 0.020 | 0.350 | — | — | — | — | — | — | — | 0.020 | 0.020 | Bal. |
| A36 | 1.50 | 0.2 | 0.020 | 0.950 | — | — | — | — | — | 0.052 | 0.005 | — | 0.057 | Bal. |
| A37 | 0.80 | 0.2 | 0.020 | 0.230 | 0.1 | 0.1 | 0.3 | 0.15 | 0.15 | 0.006 | 0.001 | 0.001 | 0.008 | Bal. |
| A38 | 1.50 | 0.2 | 0.020 | 0.230 | 0.1 | 0.1 | 0.3 | 0.15 | 0.15 | 0.072 | 0.001 | 0.021 | 0.094 | Bal. |
| A39 | 2.30 | 0.2 | 0.020 | 0.230 | 0.1 | 0.1 | 0.3 | 0.15 | 0.15 | 0.433 | 0.021 | 0.010 | 0.464 | Bal. |
| A40 | 1.50 | 0.2 | 0.020 | 0.230 | — | — | — | — | — | — | — | — | 0.000 | Bal. |
| A41 | 1.50 | 0.2 | 0.020 | 0.230 | — | — | — | — | — | — | — | — | 0.000 | Bal. |
| A42 | 1.50 | 0.2 | 0.020 | 0.230 | — | — | — | — | — | — | — | — | 0.000 | Bal. |

TABLE 3

ALLOY COMPOSITION (mass %)

| ALLOY No. | Fe | Mn | Cu | Zn | Si | Ni | Mg | Cr | Zr | Ti | B | V | Ti + B + V | Al + UNAVOIDABLE Impurities |
|---|---|---|---|---|---|---|---|---|---|---|---|---|---|---|
| AC1 | 0.02 | 0.2 | 0.020 | 0.230 | — | — | — | — | — | — | — | — | 0.000 | Bal. |
| AC2 | 3.50 | 0.2 | 0.020 | 0.230 | — | — | — | — | — | — | — | — | 0.000 | Bal. |
| AC3 | 0.20 | — | 0.020 | 0.230 | — | — | — | — | — | — | — | — | 0.000 | Bal. |
| AC4 | 1.50 | 3.5 | 0.020 | 0.230 | — | — | — | — | — | — | — | — | 0.000 | Bal. |
| AC5 | 1.50 | 0.2 | — | 0.230 | — | — | — | — | — | — | — | — | 0.000 | Bal. |
| AC6 | 1.50 | 0.2 | 1.520 | 0.230 | — | — | — | — | — | — | — | — | 0.000 | Bal. |
| AC7 | 1.50 | 0.2 | 0.020 | — | — | — | — | — | — | — | — | — | 0.000 | Bal. |
| AC8 | 1.50 | 0.2 | 0.020 | 1.520 | — | — | — | — | — | — | — | — | 0.000 | Bal. |

TABLE 3-continued

| ALLOY No. | ALLOY COMPOSITION (mass %) | | | | | | | | | | | | Al + UNAVOIDABLE Impurities |
|---|---|---|---|---|---|---|---|---|---|---|---|---|---|
| | Fe | Mn | Cu | Zn | Si | Ni | Mg | Cr | Zr | Ti | B | V | Ti + B + V | |
| AC9 | 1.50 | 0.2 | 0.020 | 0.230 | 0.7 | — | — | — | — | — | — | — | 0.000 | Bal. |
| AC10 | 1.50 | 0.2 | 0.020 | 0.230 | — | 3.6 | — | — | — | — | — | — | 0.000 | Bal. |
| AC11 | 1.50 | 0.2 | 0.020 | 0.230 | — | — | 7.2 | — | — | — | — | — | 0.000 | Bal. |
| AC12 | 1.50 | 0.2 | 0.020 | 0.230 | — | — | — | 1.40 | — | — | — | — | 0.000 | Bal. |
| AC13 | 1.50 | 0.2 | 0.020 | 0.230 | — | — | — | — | 1.40 | — | — | — | 0.000 | Bal. |
| AC14 | 1.50 | 0.2 | 0.020 | 0.230 | — | — | — | — | — | — | — | — | 0.000 | Bal. |
| AC15 | 1.50 | 0.2 | 0.020 | 0.230 | — | — | — | — | — | — | — | — | 0.000 | Bal. |
| AC16 | 1.50 | 0.2 | 0.020 | 0.230 | — | — | — | — | — | — | — | — | 0.000 | Bal. |
| AC17 | 1.50 | 0.2 | 0.020 | 0.230 | — | — | — | — | — | — | — | — | 0.000 | Bal. |
| AC18 | 1.50 | 0.2 | 0.020 | 0.230 | — | — | — | — | — | — | — | — | 0.000 | Bal. |
| AC19 | 1.50 | 0.2 | 0.020 | 0.230 | — | — | — | — | — | — | — | — | 0.000 | Bal. |
| AC20 | 1.50 | 0.2 | 0.020 | 0.230 | — | — | — | — | — | — | — | — | 0.000 | Bal. |
| AC21 | 1.50 | 0.2 | 0.020 | 0.230 | — | — | — | — | — | — | — | — | 0.000 | Bal. |

Next, the molten aluminum alloy was cast by the CC method to make a cast plate having a thickness of 7 mm (step S102). Surface heights of molten aluminum alloy flowing in the gutter disposed upstream of the nozzle disposed on the molten metal inlet side of the casting rolls and the like and casting speeds are shown in Tables 4 to 6. Note that as for alloy Nos. A8 to A10 and alloy Nos. AC8 to AC12, homogenization treatment was conducted at 380° C. for three hours (step S103).

TABLE 4

| | ALLOY NO. | SURFACE HEIGHT OF MOLTEN METAL (mm) | FLOW RATE OF MOLTEN METAL IN GUTTER (kg/minute) | CASTING SPEED (m/minute) |
|---|---|---|---|---|
| EXAMPLE 1 | A1 | 15 | 10 | 0.9 |
| EXAMPLE 2 | A2 | 15 | 10 | 0.9 |
| EXAMPLE 3 | A3 | 15 | 10 | 0.9 |
| EXAMPLE 4 | A4 | 15 | 10 | 0.9 |
| EXAMPLE 5 | A5 | 15 | 10 | 0.9 |
| EXAMPLE 6 | A6 | 15 | 10 | 0.9 |
| EXAMPLE 7 | A7 | 15 | 10 | 0.9 |
| EXAMPLE 8 | A8 | 15 | 10 | 0.9 |
| EXAMPLE 9 | A9 | 15 | 10 | 0.9 |
| EXAMPLE 10 | A10 | 15 | 10 | 0.9 |
| EXAMPLE 11 | A11 | 15 | 10 | 0.9 |
| EXAMPLE 12 | A12 | 15 | 10 | 0.9 |
| EXAMPLE 13 | A13 | 15 | 10 | 0.9 |
| EXAMPLE 14 | A14 | 15 | 10 | 0.9 |
| EXAMPLE 15 | A15 | 15 | 10 | 0.9 |
| EXAMPLE 16 | A16 | 15 | 10 | 0.9 |
| EXAMPLE 17 | A17 | 15 | 10 | 0.9 |
| EXAMPLE 18 | A18 | 15 | 10 | 0.9 |
| EXAMPLE 19 | A19 | 15 | 10 | 0.9 |
| EXAMPLE 20 | A20 | 15 | 20 | 1.5 |
| EXAMPLE 21 | A21 | 15 | 15 | 1.2 |
| EXAMPLE 22 | A22 | 15 | 10 | 0.9 |
| EXAMPLE 23 | A23 | 15 | 8 | 0.6 |
| EXAMPLE 24 | A24 | 15 | 7 | 0.4 |
| EXAMPLE 25 | A25 | 15 | 10 | 0.9 |
| EXAMPLE 26 | A26 | 15 | 10 | 0.9 |
| EXAMPLE 27 | A27 | 15 | 10 | 0.9 |
| EXAMPLE 28 | A28 | 15 | 10 | 0.9 |
| EXAMPLE 29 | A29 | 15 | 10 | 0.9 |
| EXAMPLE 30 | A30 | 15 | 10 | 0.9 |

TABLE 5

| | ALLOY NO. | SURFACE HEIGHT OF MOLTEN METAL (mm) | FLOW RATE OF MOLTEN METAL IN GUTTER (kg/minute) | CASTING SPEED (m/minute) |
|---|---|---|---|---|
| EXAMPLE 31 | A31 | 15 | 10 | 0.9 |
| EXAMPLE 32 | A32 | 15 | 10 | 0.9 |
| EXAMPLE 33 | A33 | 15 | 10 | 0.9 |
| EXAMPLE 34 | A34 | 10 | 5 | 0.9 |
| EXAMPLE 35 | A35 | 15 | 10 | 0.9 |
| EXAMPLE 36 | A36 | 18 | 30 | 0.9 |
| EXAMPLE 37 | A37 | 15 | 10 | 0.9 |
| EXAMPLE 38 | A38 | 15 | 10 | 0.9 |
| EXAMPLE 39 | A39 | 15 | 10 | 0.9 |
| EXAMPLE 40 | A40 | 6 | 2 | 0.9 |
| EXAMPLE 41 | A41 | 24 | 48 | 0.9 |
| EXAMPLE 42 | A42 | 29 | 90 | 0.9 |

TABLE 6

| | ALLOY NO. | SURFACE HEIGHT OF MOLTEN METAL (mm) | FLOW RATE OF MOLTEN METAL IN GUTTER (kg/minute) | CASTING SPEED (m/minute) |
|---|---|---|---|---|
| COMPARATIVE EXAMPLE 1 | AC1 | 15 | 10 | 0.9 |
| COMPARATIVE EXAMPLE 2 | AC2 | 15 | 10 | 0.9 |
| COMPARATIVE EXAMPLE 3 | AC3 | 15 | 10 | 0.9 |
| COMPARATIVE EXAMPLE 4 | AC4 | 15 | 10 | 0.9 |
| COMPARATIVE EXAMPLE 5 | AC5 | 15 | 10 | 0.9 |
| COMPARATIVE EXAMPLE 6 | AC6 | 15 | 10 | 0.9 |
| COMPARATIVE EXAMPLE 7 | AC7 | 15 | 10 | 0.9 |
| COMPARATIVE EXAMPLE 8 | AC8 | 15 | 10 | 0.9 |
| COMPARATIVE EXAMPLE 9 | AC9 | 15 | 10 | 0.9 |
| COMPARATIVE EXAMPLE 10 | AC10 | 15 | 10 | 0.9 |
| COMPARATIVE EXAMPLE 11 | AC11 | 15 | 10 | 0.9 |
| COMPARATIVE EXAMPLE 12 | AC12 | 15 | 10 | 0.9 |
| COMPARATIVE EXAMPLE 13 | AC13 | 15 | 10 | 0.9 |

TABLE 6-continued

| | ALLOY NO. | SURFACE HEIGHT OF MOLTEN METAL (mm) | FLOW RATE OF MOLTEN METAL IN GUTTER (kg/minute) | CASTING SPEED (m/minute) |
|---|---|---|---|---|
| COMPARATIVE EXAMPLE 14 | AC14 | 28 | 111 | 1.2 |
| COMPARATIVE EXAMPLE 15 | AC15 | 29 | 123 | 1.2 |
| COMPARATIVE EXAMPLE 16 | AC16 | 38 | 45 | 0.9 |
| COMPARATIVE EXAMPLE 17 | AC17 | 45 | 59 | 0.9 |
| COMPARATIVE EXAMPLE 18 | AC18 | 15 | 2 | 0.1 |
| COMPARATIVE EXAMPLE 19 | AC19 | 15 | 3 | 0.2 |
| COMPARATIVE EXAMPLE 20 | AC20 | 15 | 32 | 1.9 |
| COMPARATIVE EXAMPLE 21 | AC21 | 15 | 29 | 2.1 |

Next, all the cast plates subjected to homogenization treatment or not subjected to the same were rolled by cold rolling to a final thickness of 0.8 m (step S104). Note that Examples 3 to 6 were subjected to annealing treatment in the middle of cold rolling (thickness of 3.00 mm) and Example 11 was subjected to annealing treatment before cold rolling. Annealing treatment was performed for Example 3 using a batch type heating furnace, under conditions of 200° C. and 9.5 hours, for Example 4, using the batch type heating furnace, under conditions of 370° C. and 0.1 hours, for Example 5, using a continuous type heating furnace, under conditions of 350° C. and 60 seconds, for Example 6, using the continuous type heating furnace, under conditions of 390° C. and 0 seconds, and for Example 11, using the batch type heating furnace, under conditions of 250° C. and 3.0 hours. Thus, the aluminum alloy sheets were made (step S105). From the thus made aluminum alloy sheets, annular sheets having an outer diameter of 96 mm and an inner diameter of 24 mm were punched to make disk blanks (step S106).

The blank disks made as described above were subjected to pressure annealing at 370° C. for three hours (step S107). Then, end face working was performed on disk blanks subjected to pressure flattening treatment to obtain an outer diameter of 95 mm and an inner diameter of 25 mm, and grinding (surface 10 μm grinding) was performed to make an aluminum alloy substrate (step S108). Then, after degreasing at 60° C. for 5 minutes with AD-68F (trade name, made by C. Uyemura & Co., Ltd.), acid etching was performed for one minute at 65° C. with AD-107F (trade name, made by C. Uyemura & Co., Ltd.), and further desmutting was performed with 30% aqueous $HNO_3$ (room temperature) for 20 seconds (step S109).

After the surface condition was adjusted in this manner, the disk blank was immersed in a 20° C. zincate treatment solution of AD-301F-3X (trade name, made by C. Uyemura & Co., Ltd.) for 0.5 minutes to subject the surface to zincate treatment (step S109). Note that the zincate treatment was executed twice in total, and the surface was peeled off by dipping in a 30% aqueous $HNO_3$ solution at room temperature for 20 seconds between the executions of the zincate treatment. After the zincate-treated surface was electrolessly plated with Ni—P to a thickness of 11.5 μm using an electroless Ni—P plating solution (Nimden HDX (trade name, made by C. Uyemura & Co., Ltd.)), finish polishing was performed using a feather cloth (1.5 μm polishing amount). Thus, the aluminum alloy base disk was made (step S111).

The following evaluation was performed on specimens of the aluminum alloy sheet after the cold rolling (step S104) or the aluminum alloy base disk after the plating treatment polishing (step S110). Note that Comparative Examples 14, 15, 18, and 19 solidified before casting and could not be cast, and hence the evaluation was not performed on them. Further, for each specimen, three disks made under the same conditions were subjected up to the plating treatment, but all the three disks of each of Comparative Examples 2, and 4 to 13 suffered from plating peeling. Therefore, for these Comparative Examples, the evaluation of the fluttering characteristic could not be performed.

[Distribution Density of Second Phase Particles Having a Maximum Diameter of 100 μm or More and 300 μm or Less]

After the cross-sectional surface of an aluminum alloy sheet after the cold rolling (step S104) was polished, a filed of view of 1 $mm^2$ was observed at a magnification of 1000 times using an optical microscope, and distribution densities (number of particles/$mm^2$) of second phase particles in a region (A) and a region (C) were calculated using a particle analysis software "AZO-KUN" (tradename manufactured by Asahi Kasei Engineering Corporation). Observation was performed on an L-ST cross-section (cross-section defined by a rolling direction and a thickness direction). Note that the field of view observation was performed on a plurality of portions amounting to a total of 1.0 $mm^2$, and the total of particles in each area was counted to determine a distribution density. The results are shown in Tables 7 to 9.

TABLE 7

| | ALLOY NO. | DENSITY DISTRIBUTION OF SECOND PHASE PARTICLES IN REGION (A) (particles/$mm^2$) | DENSITY DISTRIBUTION OF SECOND PHASE PARTICLES IN REGION (C) (particles/$mm^2$) | AMOUNT OF Mn SOLID SOLUTION | STRENGTH YIELD STRENGTH (MPa) | EVALUATION | FLUTTERING CHARACTERISTIC |
|---|---|---|---|---|---|---|---|
| EXAMPLE 1 | A1 | 1 | 0 | 0.12 | 66 | B | C |
| EXAMPLE 2 | A2 | 2 | 0 | 0.13 | 82 | A | B |
| EXAMPLE 3 | A3 | 5 | 0 | 0.09 | 83 | A | A |
| EXAMPLE 4 | A4 | 6 | 0 | 0.06 | 91 | A | A |
| EXAMPLE 5 | A5 | 7 | 0 | 0.08 | 106 | A | A |
| EXAMPLE 6 | A6 | 6 | 0 | 0.05 | 132 | A | A |
| EXAMPLE 7 | A7 | 7 | 0 | 0.11 | 148 | A | A |
| EXAMPLE 8 | A8 | 8 | 0 | 0.05 | 185 | A | A |
| EXAMPLE 9 | A9 | 10 | 0 | 0.05 | 221 | A | A |
| EXAMPLE 10 | A10 | 21 | 0 | 0.06 | 253 | A | A |

TABLE 7-continued

| | ALLOY NO. | DENSITY DISTRIBUTION OF SECOND PHASE PARTICLES IN REGION (A) (particles/mm$^2$) | DENSITY DISTRIBUTION OF SECOND PHASE PARTICLES IN REGION (C) (particles/mm$^2$) | AMOUNT OF Mn SOLID SOLUTION | STRENGTH YIELD STRENGTH (MPa) | EVALUATION | FLUTTERING CHARACTERISTIC |
|---|---|---|---|---|---|---|---|
| EXAMPLE 11 | A11 | 5 | 0 | 0.09 | 102 | A | A |
| EXAMPLE 12 | A12 | 6 | 0 | 0.18 | 132 | A | A |
| EXAMPLE 13 | A13 | 4 | 0 | 0.35 | 210 | A | A |
| EXAMPLE 14 | A14 | 19 | 0 | 0.79 | 231 | A | A |
| EXAMPLE 15 | A15 | 31 | 0 | 0.91 | 235 | A | B |
| EXAMPLE 16 | A16 | 5 | 0 | 0.11 | 161 | A | A |
| EXAMPLE 17 | A17 | 12 | 0 | 0.13 | 173 | A | A |
| EXAMPLE 18 | A18 | 10 | 0 | 0.12 | 221 | A | A |
| EXAMPLE 19 | A19 | 11 | 0 | 0.12 | 191 | A | A |
| EXAMPLE 20 | A20 | 48 | 0 | 0.12 | 201 | A | C |
| EXAMPLE 21 | A21 | 15 | 0 | 0.13 | 298 | A | A |
| EXAMPLE 22 | A22 | 12 | 0 | 0.11 | 287 | A | A |
| EXAMPLE 23 | A23 | 11 | 0 | 0.13 | 231 | A | A |
| EXAMPLE 24 | A24 | 14 | 0 | 0.12 | 187 | A | A |
| EXAMPLE 25 | A25 | 10 | 0 | 0.11 | 208 | A | A |
| EXAMPLE 26 | A26 | 15 | 0 | 0.13 | 174 | A | A |
| EXAMPLE 27 | A27 | 8 | 0 | 0.11 | 221 | A | C |
| EXAMPLE 28 | A28 | 8 | 0 | 0.13 | 181 | A | A |
| EXAMPLE 29 | A29 | 9 | 0 | 0.13 | 191 | A | A |
| EXAMPLE 30 | A30 | 10 | 0 | 0.12 | 211 | A | A |

TABLE 8

| | ALLOY NO. | DENSITY DISTRIBUTION OF SECOND PHASE PARTICLES IN REGION (A) (particles/mm$^2$) | DENSITY DISTRIBUTION OF SECOND PHASE PARTICLES IN REGION (C) (particles/mm$^2$) | AMOUNT OF Mn SOLID SOLUTION | STRENGTH YIELD STRENGTH (MPa) | EVALUATION | FLUTTERING CHARACTERISTIC |
|---|---|---|---|---|---|---|---|
| EXAMPLE 31 | A31 | 9 | 0 | 0.13 | 148 | A | A |
| EXAMPLE 32 | A32 | 10 | 0 | 0.11 | 191 | A | A |
| EXAMPLE 33 | A33 | 13 | 0 | 0.12 | 234 | A | A |
| EXAMPLE 34 | A34 | 10 | 0 | 0.13 | 184 | A | A |
| EXAMPLE 35 | A35 | 10 | 0 | 0.10 | 190 | A | A |
| EXAMPLE 36 | A36 | 9 | 0 | 0.13 | 189 | A | A |
| EXAMPLE 37 | A37 | 10 | 0 | 0.13 | 132 | A | A |
| EXAMPLE 38 | A38 | 14 | 0 | 0.10 | 191 | A | A |
| EXAMPLE 39 | A39 | 19 | 0 | 0.10 | 211 | A | A |
| EXAMPLE 40 | A40 | 10 | 0 | 0.12 | 143 | A | A |
| EXAMPLE 41 | A41 | 11 | 0 | 0.10 | 134 | A | A |
| EXAMPLE 42 | A42 | 12 | 0 | 0.13 | 134 | A | A |

TABLE 9

| | ALLOY NO. | DENSITY DISTRIBUTION OF SECOND PHASE PARTICLES IN REGION (A) (particles/mm$^2$) | DENSITY DISTRIBUTION OF SECOND PHASE PARTICLES IN REGION (C) (particles/mm$^2$) | AMOUNT OF Mn SOLID SOLUTION | STRENGTH YIELD STRENGTH (MPa) | EVALUATION | FLUTTERING CHARACTERISTIC |
|---|---|---|---|---|---|---|---|
| COMPARATIVE EXAMPLE 1 | AC1 | 0 | 0 | 0.10 | 38 | C | D |
| COMPARATIVE EXAMPLE 2 | AC2 | 75 | 0 | 0.12 | 256 | A | — |
| COMPARATIVE EXAMPLE 3 | AC3 | 2 | 0 | 0.00 | 51 | C | D |
| COMPARATIVE EXAMPLE 4 | AC4 | 43 | 0 | 0.98 | 245 | A | — |

TABLE 9-continued

| | ALLOY NO. | DENSITY DISTRIBUTION OF SECOND PHASE PARTICLES IN REGION (A) (particles/mm$^2$) | DENSITY DISTRIBUTION OF SECOND PHASE PARTICLES IN REGION (C) (particles/mm$^2$) | AMOUNT OF Mn SOLID SOLUTION | STRENGTH YIELD STRENGTH (MPa) | EVALUATION | FLUTTERING CHARACTERISTIC |
|---|---|---|---|---|---|---|---|
| COMPARATIVE EXAMPLE 5 | AC5 | 11 | 0 | 0.11 | 123 | A | — |
| COMPARATIVE EXAMPLE 6 | AC6 | 21 | 0 | 0.11 | 201 | A | — |
| COMPARATIVE EXAMPLE 7 | AC7 | 11 | 0 | 0.10 | 113 | A | — |
| COMPARATIVE EXAMPLE 8 | AC8 | 13 | 0 | 0.06 | 192 | A | — |
| COMPARATIVE EXAMPLE 9 | AC9 | 15 | 0 | 0.06 | 175 | A | — |
| COMPARATIVE EXAMPLE 10 | AC10 | 65 | 0 | 0.07 | 241 | A | — |
| COMPARATIVE EXAMPLE 11 | AC11 | 21 | 0 | 0.06 | 234 | A | — |
| COMPARATIVE EXAMPLE 12 | AC12 | 38 | 0 | 0.07 | 222 | A | — |
| COMPARATIVE EXAMPLE 13 | AC13 | 37 | 0 | 0.12 | 261 | A | — |
| COMPARATIVE EXAMPLE 14 | AC14 | 9 | 4 | 0.10 | 115 | A | D |
| COMPARATIVE EXAMPLE 15 | AC15 | 8 | 5 | 0.11 | 121 | A | D |
| COMPARATIVE EXAMPLE 16 | AC16 | 12 | 3 | 0.11 | 112 | A | D |
| COMPARATIVE EXAMPLE 17 | AC17 | 11 | 5 | 0.11 | 123 | A | D |
| COMPARATIVE EXAMPLE 18 | AC18 | — | — | — | — | — | — |
| COMPARATIVE EXAMPLE 19 | AC19 | — | — | — | — | — | — |
| COMPARATIVE EXAMPLE 20 | AC20 | 76 | 0 | 0.01 | 55 | C | D |
| COMPARATIVE EXAMPLE 21 | AC21 | 81 | 0 | 0.01 | 53 | C | D |

[Amount of Mn Solid Solution]

Measurement of the amount of Mn solid solution was performed using an aluminum alloy sheet after cold rolling (step S104), by the following steps. From residues obtained by the hot phenol dissolution extraction method, a total amount of precipitated Mn in the aluminum alloy sheet was measured by analysis, and a value calculated by subtracting a measured value from a Mn component analysis value was set as the amount of Mn solid solution. That is, Mn contained in the aluminum alloy is considered to be formed by Mn in the state of solid solution and Mn in the state of intermetallic compounds as second phase particles. Note that the analysis method of the amount of Mn precipitation is performed by referring to the professional literature of "Summary of 68th Spring Meeting Lecture of Japanese Institute of Light Metals, by Satou and Izumi, (1988), 51", and the professional literature of "Summary of 76th Spring Meeting Lecture of Japanese Institute of Light Metals, by Muramtu, Matuo, Komatu, et al, (1989), 51".

The hot phenol dissolution extraction method will be described. A test specimen of 2 g was extracted from an aluminum alloy sheet. Note that for the test specimens, small pieces were cut out from the aluminum alloy sheet and weighed so as to obtain a total amount of 2 g. Next, after a beaker containing phenol of 50 ml was placed on a hot plate and the phenol was heated up to 170 to 180° C., a specimen was put into the beaker to dissolve the specimen in the phenol. Then, the beaker containing the solution was moved from the hot plate and cooled. Then, for prevention of solidification, benzyl alcohol was added to the cooled solution. Next, the solution to which benzyl alcohol was added was filtrated using a membrane filter made of polytetrafluoroethylene (pore diameter of 0.1 µm) to obtain second phase particles as residues. Then, Si in the residues obtained by the hot phenol dissolution extraction method was dissolved using a 10% NaOH solution, and then using a mixed solution formed by adding aqua regia to the solution, Mn was dissolved. Thus, a mixed solution containing dissolved Si and Mn was obtained. Then, the mixed solution was subjected to quantitative analysis by the inductively coupled plasma-atomic emission spectroscopy (ICP). By this spectroscopy, the amount of Mn precipitated as second phase particles was determined.

Next, the amount of precipitated Mn obtained by the hot phenol dissolution extraction method was set to the total amount of precipitated Mn, and a value calculated by subtracting the total amount of precipitated Mn from the Mn component analysis value was determined as the amount of Mn solid solution. The results are shown in Tables 7 to 9.

[Yield Strength]

The yield strength conforms to JIS Z2241, and after the aluminum alloy sheet after the cold rolling (step S104) was subjected to annealing (pressure annealing simulated heating) at 370° C. for three hours, a tensile test specimens of JIS No. 5 was extracted along the rolling direction for measurement with n=2. The strength is evaluated as A (excellent) for a yield strength of 80 MPa or higher, B (good) for a yield strength of 60 MPa or higher and lower than 80 MPa, and C (poor) for a yield strength of lower than 60 MPa. The results are shown in Tables 7 to 9.

[Measurement of Disk Flutter]

Disk flutter was measured using an aluminum alloy base disk after the plating treatment polishing step (step S110). Measurement of disk flutter was performed by placing the aluminum alloy substrate in a commercially available hard disk drive in the presence of air. ST2000 (trade name) made by Seagate Technology was used as the drive, and a motor was driven by directly connecting SLD102 (trade name) made by Techno Alive Co. thereto. The rotational speed of the motor was set to 7200 rpm, and a plurality of disks were always placed for observing vibrations of the surface of each of the disks using LV1800 (trade name), as a laser Doppler meter, made by Ono Sokki Co., Ltd. The observed vibrations were subjected to spectrum analysis using FET analyzer DS3200 (trade name) made by Ono Sokki Co., Ltd. The observation was performed by forming a hole in the cover of the hard disk drive and observing the surface of the disk through the hole. Further, the evaluation was performed by removing a squeeze plate set in the commercially available hard disk.

The fluttering characteristic was evaluated using the maximum displacement (disk fluttering (nm)) of a broad peak in a range of 300 to 1500 Hz and therearound where fluttering appears. Such a broad peak, referred to as non-repeatable run out (NRRO), has been found to have a significant influence on the positioning error of a head. In air, a fluttering characteristic of 30 nm or less was evaluated as A (Excellent), a fluttering characteristic of more than 30 nm and 40 nm or less was evaluated as B (Good), a fluttering characteristic of more than 40 nm and 50 nm or less was evaluated as C (Fair), and a fluttering characteristic of more than 50 nm was evaluated as D "Poor". The results are set forth in Tables 3 to 5.

As shown in Tables 7 to 9, Examples 1 to 42 were favorable in the strength and the fluttering characteristic. In contrast, Comparative Examples 1 to 21 were poor in either of the strength and the fluttering characteristic, or due to incapability of casting, the strength and the fluttering characteristic could not be evaluated, or due to occurrence of plating peeling, the fluttering characteristic could not be evaluated.

Specifically, Comparative Example 1 was too low in the content of Fe and accordingly poor in the strength and the fluttering characteristic.

Comparative Example 2 was too high in the content of Fe, causing plating peeling, and accordingly the fluttering characteristic could not be evaluated. Further, the distribution density of second phase particles in the region (A) was too high.

Comparative Example 3 had no content of Mn and hence there was no amount of Mn solid solution, which made poor in the strength and the fluttering characteristic.

Comparative Example 4 was too high in the content of Mn, causing plating peeling, and accordingly the fluttering characteristic could not be evaluated.

Comparative Example 5 had no Cu content, causing plating peeling, and accordingly the fluttering characteristic could not be evaluated.

Comparative Example 6 was too high in the content of Cu, causing plating peeling, and accordingly the fluttering characteristic could not be evaluated.

Comparative Example 7 had no Zn content, causing plating peeling, and accordingly the fluttering characteristic could not be evaluated.

Comparative Example 8 was too high in the content of Zn, causing plating peeling, and accordingly the fluttering characteristic could not be evaluated.

Comparative Example 9 was too high in the content of Si, causing plating peeling, and accordingly the fluttering characteristic could not be evaluated.

Comparative Example 10 was too high in the content of Ni, causing plating peeling, and accordingly the fluttering characteristic could not be evaluated. Further, the distribution density of second phase particles in the region (A) was too high.

Comparative Example 11 was too high in the content of Mg, causing plating peeling, and accordingly the fluttering characteristic could not be evaluated.

Comparative Example 12 was too high in the content of Cr, causing plating peeling, and accordingly the fluttering characteristic could not be evaluated.

Comparative Example 13 was too high in the content of Zr, causing plating peeling, and accordingly the fluttering characteristic could not be evaluated.

Comparative Examples 14 and 15 were too high in the flow rate of molten metal in the gutter, and accordingly a large number of second phase particles having the maximum diameter of 100 µm or more and 300 µm or less were generated in the region (C). As a result, the fluttering characteristic was poor.

Comparative Examples 16 and 17 were too high in the surface height of molten metal, and accordingly a large number of second phase particles having the maximum diameter of 100 µm or more and 300 µm or less were generated in the region (C). As a result, the fluttering characteristic was poor.

Comparative Examples 18 and 19 were too slow in the casting speed, and accordingly the molten metal solidified before casting, making it impossible to perform casting, and accordingly the fluttering characteristic and the strength could not be evaluated.

Comparative Examples 20 and 21 were too fast in the casting speed, and accordingly a large number of second phase particles having the maximum diameter of 100 µm or more and 300 µm or less were generated in the region (A). As a result, the fluttering characteristic was poor. Further, the amount of Mn solid solution was too large, so that the strength was poor.

INDUSTRIAL APPLICABILITY

According to the present disclosure, it is possible to obtain an aluminum alloy sheet which is high in strength and is excellent in the fluttering characteristic of a magnetic disk and a method for producing the same, and a magnetic disk using the same.

The invention claimed is:

1. An aluminum alloy sheet for a magnetic disk, the aluminum alloy sheet comprising:
an aluminum alloy comprising 0.10 to 3.00 mass % of Fe, 0.1 to 3.0 mass % of Mn, 0.003 to 1.000 mass % of Cu, 0.005 to 1.000 mass % of Zn, 0.4 mass % or less of Si, and optionally one or more elements selected from a group consisting of 0.1 to 3.0 mass % of Ni, 0.1 to 6.0 mass % of Mg, 0.01 to 1.00 mass % of Cr, and 0.01 to 1.00 mass % of Zr, with a balance of Al and unavoidable impurities, wherein
second phase particles having a maximum diameter of 100 µm or more and 300 µm or less are dispersed at a distribution density of 50 particles/mm² or less in a region (A) occupying 25% or less of a sheet thickness from a sheet thickness center plane to opposite surfaces of the sheet, second phase particles having a maximum diameter of 100 μm or more and 300 μm or less are 0 particles/mm$^2$ in a region (C) excluding the region (A) from a region (B) occupying 50% or less of the sheet thickness from the sheet thickness center plane to the opposite surfaces of the sheet, and an amount of Mn solid solution is 0.03 to 1.00 mass %.

2. The aluminum alloy sheet according to claim 1, wherein the aluminum alloy further comprises one or more elements selected from a group comprising Ti, B, and V, of which a total content is 0.005 to 0.500 mass %.

3. A magnetic disk, wherein an electroless Ni—P plating-treated layer and a magnetic substance layer thereon are provided on a surface of an aluminum alloy substrate comprising the aluminum alloy sheet according to claim 1.

4. A method for producing the aluminum alloy sheet according to claim 1, the method comprising:
a continuous casting step of continuously casting a cast plate using the aluminum alloy, and
a cold rolling step of cold-rolling the cast plate, wherein
in the casting step, the flow rate of molten metal flowing in a gutter for supplying a casting section for casting a casting plate is set to 100 kg/minute or lower, and also, a molten metal surface height is set to 30 mm or less and the casting speed is set to 0.4 to 1.5 m/minute.

5. The method according to claim 4, further comprising:
a homogenization treatment step of heating the cast plate at 300 to 450° C. for 0.5 to 24 hours, between the continuous casting step and the cold rolling step.

6. The method according to claim 4, further comprising:
an annealing treatment step of annealing the cast plate or cold-rolled sheet before or in the middle of the cold rolling.

* * * * *